(12) United States Patent
Harris (10) Patent No.: US 7,616,363 B2
(45) Date of Patent: Nov. 10, 2009

(54) METHOD AND APPARATUS FOR MASS PRODUCTION OF HOLOGRAMS

(76) Inventor: Kenneth R. Harris, 3006 Vista Grande NW., Albuquerque, NM (US) 87120

( * ) Notice: Subject to any disclaimer, the term of this patent is extended or adjusted under 35 U.S.C. 154(b) by 372 days.

(21) Appl. No.: 11/459,821

(22) Filed: Jul. 25, 2006

(65) Prior Publication Data

US 2007/0024939 A1    Feb. 1, 2007

Related U.S. Application Data

(60) Provisional application No. 60/702,785, filed on Jul. 26, 2005.

(51) Int. Cl.
*G03H 1/04* (2006.01)
(52) U.S. Cl. .................................... 359/35; 359/10
(58) Field of Classification Search .................. 359/2, 359/22, 567, 10, 35; 283/86; 430/1, 2
See application file for complete search history.

(56) References Cited

U.S. PATENT DOCUMENTS

| | | | |
|---|---|---|---|
| 4,888,260 A | 12/1989 | Cowan | |
| 4,915,464 A | 4/1990 | Hopwood | |
| 5,262,879 A | 11/1993 | Davis | |
| 5,640,257 A * | 6/1997 | Clube | 359/30 |
| 5,757,521 A | 5/1998 | Walters et al. | |
| 5,822,089 A | 10/1998 | Phillips et al. | |
| 5,822,092 A | 10/1998 | Davis | |
| 6,486,982 B1 | 11/2002 | Davis | |
| 2002/0109872 A1 | 8/2002 | Hart | |
| 2004/0146751 A1 | 7/2004 | Cueli | |
| 2005/0122549 A1* | 6/2005 | Goulanian et al. | 359/3 |

FOREIGN PATENT DOCUMENTS

| | | |
|---|---|---|
| EP | 0303355 | 2/1989 |
| EP | 0305334 | 3/1989 |

* cited by examiner

*Primary Examiner*—Alessandro Amari
(74) *Attorney, Agent, or Firm*—Philip D. Askenazy; Peacock Myers, P.C.

(57) ABSTRACT

A device and method for mass producing reflection holograms. Photosensitive material is drawn across an object to be copied and coherent radiation is scanned across the material and the object. The object may comprise a component which is variable, such as a counter, or a hologram. The exposed photosensitive material is removed from the object, the symbols on the object are changed if desired, fresh material is moved into place, and a new hologram is created. The holograms of the present invention preferably have the capability to be sequentially or individually numbered or otherwise customized with a variety of symbols, for example for security purposes.

30 Claims, 9 Drawing Sheets

METHOD AND APPARATUS FOR MASS PRODUCTION OF HOLOGRAMS

CROSS-REFERENCE TO RELATED APPLICATIONS

This application claims the benefit of the filing of U.S. Patent Application Ser. No. 60/702,785, entitled "Method and Apparatus for Mass Production of Reflection Holograms and Volume Holographic Optical Elements", filed on Jul. 26, 2005, and the specification thereof is incorporated herein by reference.

BACKGROUND OF THE INVENTION

1. Field of the Invention (Technical Field)

The present invention is a method and apparatus for mass production of individualized reflection holograms and volume diffraction grating devices. The holograms preferably have the capability to be sequentially or individually numbered or otherwise customized with a variety of symbols, for example for security purposes.

2. Background Art

Note that the following discussion refers to a number of publications and references. Discussion of such publications herein is given for more complete background of the scientific principles and is not to be construed as an admission that such publications are prior art for patentability determination purposes.

Previous work in reproduction of reflection or volume holograms has primarily been directed toward single units or the copying of an original reflection or volume hologram using traditional holographic copying methods.

Only transmission (2D/3D) and dot matrix holograms have previously been mass produced for the decorative and security markets. An Embossing Master hologram is typically used, which has the disadvantage of being only to replicate the single image of the Embossing Master; there is no provision for sequential numbering or individually controlled image areas. For example, U.S. Pat. Nos. 5,262,879, 5,822,092, and 6,486,982 disclose embossing systems which produce diffraction gratings in a pixilated format.

Vibration has been the primary limitation for the reproduction of reflection holograms in a production environment. A vibration difference between the object recording beam and the reference beam prohibits the formation of a hologram. Dinisyuk-type holograms are less sensitive to this problem. Dinisyuk-type single-beam reflection holograms are well known; typically a single laser beam is transmitted through a photosensitive coated material, for example a film or plate, illuminates an object which is behind the plane of the material and possibly touching the material, and reflects back through the material, forming a volume hologram in the material. Unlike split-beam holographic methods, Dinisyuk holograms have the advantage of being less sensitive to vibration when the object is touching the material. However, there is no existing method capable of mass reproducing such holograms, or providing sequential numbers on successive reproductions thereof.

SUMMARY OF THE INVENTION

Disclosure of the Invention

The present invention is a method for producing a reflection hologram, the method comprising the steps of disposing an area of unexposed radiation-sensitive material proximate to an object, passing an incident beam of coherent radiation (also known as the reference beam) through the radiation-sensitive material, illuminating at least a portion of the object by scanning the incident beam across the object, and reflecting the incident beam and interfering the reflected beam (also known as the object beam) with the incident beam, thereby exposing the radiation-sensitive material to create a reflection hologram. The steps of the method are preferably repeated for a second area of unexposed radiation-sensitive material. The disposing step preferably comprises moving the radiation-sensitive material across the object, preferably by unrolling unexposed radiation-sensitive material from a first roller and rolling up exposed radiation-sensitive material on a second roller. The radiation-sensitive material is preferably selected from the group consisting of film, assembled film, sticker, label, and release layer. The assembled film preferably comprises a layer of radiation-sensitive material, a release layer, and a carrier film. The coherent radiation optionally comprises multiple wavelengths, in which case the reflection hologram optionally comprises a full parallax hologram and the object preferably comprises multiple colors. A viewer of the hologram preferably sees the entire scanned portion of the object. The hologram preferably captures three dimensional imaging of only the portion of the object. The method preferably further comprises the step of varying a depth of the three dimensional imaging by varying a size of the incident beam.

The size of the incident beam is preferably smaller than the portion of the object. The width of the incident beam is preferably approximately the same as the width of the portion of the object, and the length of the incident beam is preferably smaller than the length of the portion of the object. The incident beam optionally approximately comprises a point source. The incident beam is preferably reflected from the object or from a mirror which reflects the beam back through the object. The radiation-sensitive material is preferably exposed from more than one direction and/or by more than one beam.

The object preferably comprises one or more elements selected from the group consisting of decorated plate, image, transmission holographic image, modular printing plate, counter, modular roller, image pot, numbering unit, module, mirror, highly reflective material, holographic optical element, directions diffuser, optical construct, optical lens, and optically variable device. For a transmission holographic image, the angle of the incident beam relative to the object is approximately the same as an original construction angle of the transmission holographic image. The object optionally modulates the incident beam and/or the reflected beam. The method preferably further comprises the step of varying the object after the reflecting step, wherein the varying step preferably comprises changing a number or code on the object. The object optionally comprises a roller rotating at a linear velocity substantially matching a conveying velocity of the radiation-sensitive material. The method preferably further comprises the step of monitoring a latent image. Scanning the incident beam preferably comprises moving either or both of the object and the incident beam relative to one another. The method optionally further comprises the step of varying a distance between the object and the radiation-sensitive material.

The invention is also an apparatus for producing a reflection hologram, the apparatus comprising a source of coherent radiation, a supply of radiation-sensitive material, a support for supporting an object proximate to the material, and a scanner for scanning a beam of the coherent radiation through the radiation-sensitive material and across the object. The supply preferably provides unexposed radiation-sensitive material to the object and removes exposed radiation-sensitive material from said object. The supply preferably comprises one or more rollers. The support is preferably selected from the group consisting of modular printing plate and roller. The apparatus optionally further comprises additional sources of coherent radiation. The source optionally produces multiple wavelengths of the radiation. The beam is preferably smaller than the object. The object optionally comprises a transmission hologram, in which case the angle of incidence between the beam and the object is approximately the same as the original construction angle of the transmission hologram. The appearance of the object is preferably variable. For example, the object optionally comprises a counter.

An object of the present invention is to provide a method and apparatus for reducing the time required to print a reflection hologram while increasing its effective efficiency in a production environment.

An advantage of the present invention is that it can produce non-pixilated directional diffuser patterns and images as volume, reflection, or thick holograms.

Another advantage of the present invention is that Holographic Optical Elements (HOEs) can be made the entire size of the material, or to the size limit of the machine, for example up to 1 m×1 m or larger in size.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

Best Modes for Carrying Out the Invention

The present invention is a method and apparatus for mass reproduction of reflection holograms, preferably sectionally-scanned Dinisyuk-type single-beam holograms. Reflection holograms typically show no rainbow phenomenon, play back primarily, but not always, in a single color, and are visible in normal light. The holograms may comprise one or more structures with diffractive properties in a single color, or a multiplicity of colors with reconstructed angle playback close to the recording conditions. The present invention is capable of high production speeds and efficiencies due to the reduction of the required depth of the recorded hologram and the preferable use of one or more coherent light sources, such as lasers, preferably high power CW or pulsed lasers, such as a ruby pulsed laser, although any light source or other electromagnetic radiation source, including for example a semiconductor diode laser, may optionally be employed, provided that the light source is coherent and has the coherence distance required by the image. Optionally the light source comprises more than one wavelength; for example, red, green, and blue beams may be used to create a full color full parallax hologram. Optionally, an electron beam or another coherent beam with a suitable coherence length may be used. A description of typical light sources may be found in U.S. Patent Application Publication No. 2005/0052717, incorporated herein by reference.

The present invention is capable of producing holograms that are sequentially numbered or comprise other varying symbols for security and other applications and individual holographic label devices such as HOEs as volume holograms recorded on photo-definable material. There are many applications for a system with this capability. For example, numbers on individual holograms could be matched with serial numbers or other identifying numbers of corresponding currency bills, documents, or security labels or instruments. This would discourage or eliminate forgery of items such as cigarette packages, perfumes, drugs, branded products and the like. Product brand verification could require authentication through secure holographic labeling.

Unlike typical reflection hologram systems which illuminate the entire image with the beam, the present invention preferably builds up a complete holographic image by scanning only one portion of the complete object or image at a time with a scanning beam. This portion, or frame, is defined in part by the width and length of the scanning beam. By decreasing the recording beam to a focused scanning beam, the present invention is able to greatly increase the recording power of the laser. When the holographic image is developed, the viewer does not necessarily see the individual scanned frames, but only the complete image. This is made possible since only the surface of the image, or near the surface of the image, including but not limited to the letters or logo image and the depth information between them, is preferably being recorded. Unlike typical holograms which record the whole image at once, the holograms of the present invention produce three dimensional imaging in areas that can be defined or limited, which is all that is required for many applications, for example sequence numbering for security purposes. As the length of the scanning beam is increased, the viewing depth or continuous 3D area is increased. Alternatively the present invention may comprise the use of continuous scanning.

The present process, preferably computer controlled, preferably requires only a single light source, preferably comprising a monochromatic laser. The reflection hologram is then preferably formed from the reflected light from the object or objects, or from a mirror setup which passes the light back through the object or open areas of a mask, light gate, or the like. The present invention does not require typical complete image play-back to record material; i.e., only the image within the scanned area of the width and length of the scanning beam is recorded. The volume information is built up by continued scanning of the image(s); the light source is preferably scanned across the surface in a continuous method exposing the recording material equally, providing a few millimeters of volume information. The scan may be performed from a fixed position or in any manner known in the art, or via multiple beams from the same light source or other light sources. For example, a vertical beam could be scanned from left to right, or even randomly. Or, the recording material could be exposed from several directions, either sequentially or simultaneously, so that the image appears as a full area or other traditional hologram.

Figure 1:
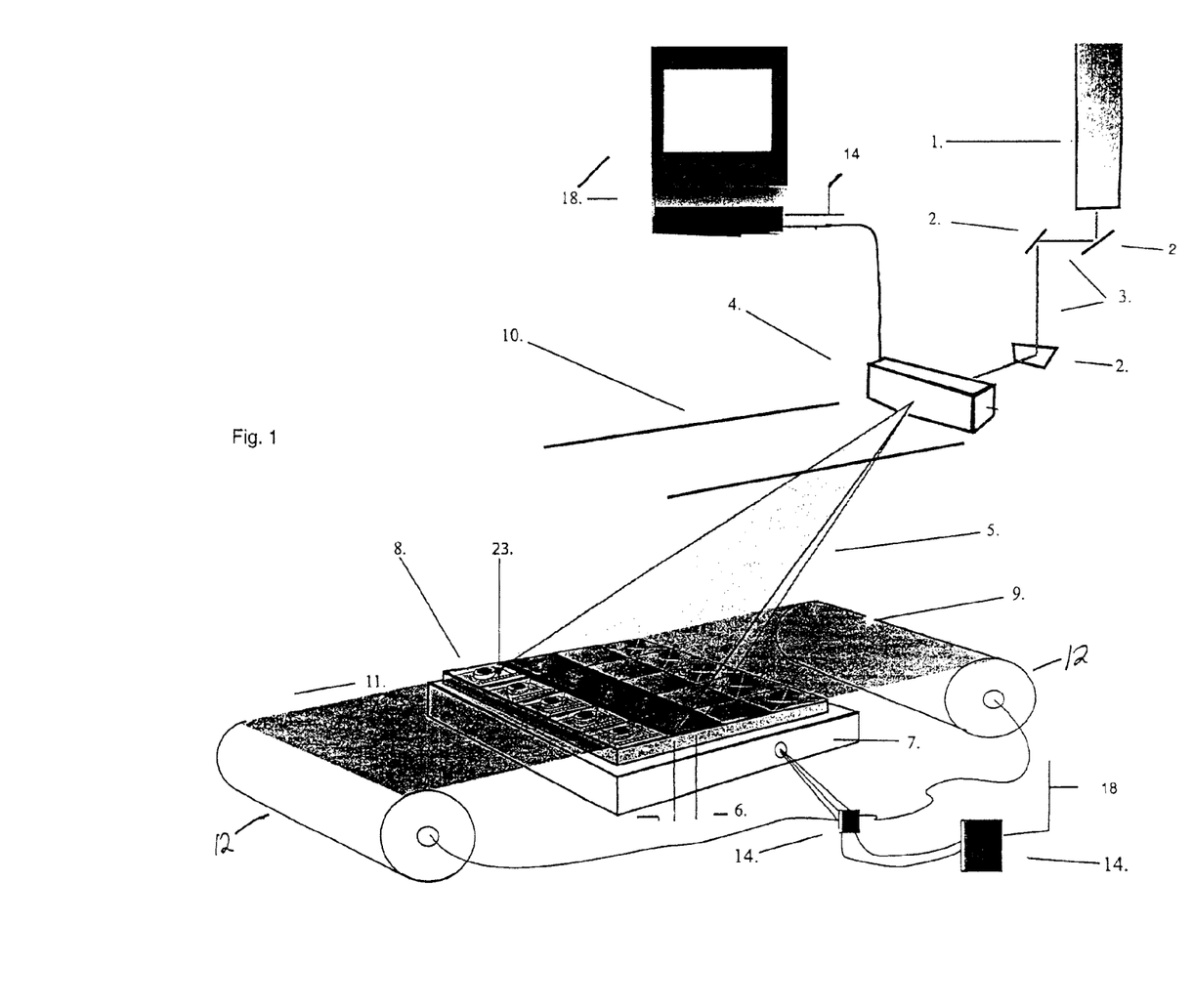
FIG. 1 is a schematic of a single beam scanning apparatus of the present invention, wherein the film is supplied to a printing plate by a roller system.

FIG. 1 shows a single beam scanning system of the present invention. Coherent light or laser beam 3 from laser 1 preferably passes by way of directional mirrors 2, or optionally one or more optical fibers, to steering unit 4, where the laser beam is converted by optical means known in the art, for example scanning optics, into a scanning beam 5. An optical system may optionally be used to collimate the beam or otherwise modulate the beam to be, for example, concave or convex, so that it is useful with optically variable devices. Scanning beam 5 can be made to the size of the image or a size smaller or larger then the image or object to be copied, and may comprise any length or shape as desired. The laser could be a continuous wave or a pulsed laser; the higher power of a pulsed laser may increase the speed of hologram formation. The structure (shape) and scanning length 6 of scanning beam 5 is preferably determined by computerized control system 18 in accordance with the requirements of the particular process. Scanning length 6 is related directly to the power of laser 1 and is partially determined by the exposing energy required by photo-sensitive material 9, preferably a film. Photo-sensitive material 9 may optionally comprise a photo-profile material or other suitable photo-active material. Photo-sensitive material 9 is preferably disposed directly adjacent to modular printing plate 8, which is preferably disposed on base 7. Photo-sensitive material 9 may optionally be clamped, under tension, or otherwise be forced against modular printing plate 8 during exposure. Alternatively, the distance between photo-sensitive material 9 and modular printing plate 8 may optionally be varied.

The required exposing energy determines the scanning speed of scanning beam 5. Scanning is preferably performed by moving steering unit 4 in direction 10 by mechanical means well known in machine production. Optionally, scanning beam 5 is stationary and modular printing plate 8 is moved. The scanning rate of scanning beam 5 relative to modular printing plate 8 is chosen so that photo-sensitive material 9 has been properly exposed to create a reflection hologram of maximum brightness for production. Preferably the entire modular printing plate 8 is scanned. Although modular printing plate 8 preferably comprises individual modules, and each module preferably comprises an individual progressive counter, an engraved or otherwise decorated plate or one or more transmission holograms may alternatively be used. If multiple wavelengths are used, the plate may optionally be colored to reflect the different colored beams. During scanning, the interference between coherent scanning beam 5 which first irradiates photo-sensitive material 9, and the light which passes through photo-sensitive material 9 and reflects from modular printing plate 8, creates a reflection (volume) hologram in photo-sensitive material 9.

Once scanning is complete, photo-sensitive material 9 is moved along preferably by rollers 12, preferably in direction 11, until an unexposed section of the material is in position for the next scan. One or more sub-systems 14, which preferably comprise a processor or like device, advances the numbers on counters 23 as required, preferably while the material is being repositioned by rollers 12. Sub-systems 14 are preferably under the direction of computerized control system 18 and preferably run a predetermined program. Once the entire roll of photo-sensitive material 9 is exposed, it is preferably processed (for example, developed) as required and then slit or otherwise divided and optionally further converted to make the final product, for example a label. Until processing of photo-sensitive material 9, the entire method is preferably carried out in a safelight or darkroom environment in accordance with the requirements of the recording material.

Optionally the latent image of a tracking image, standardized for production, could be monitored to ensure that the material is receiving the proper energy from the laser (as related to the moving speed of the material) so that the required holographic information is being recorded. Also, the image plate can be scanned in one single pass of a selected area or multiple passes in the selected area until the photo-sensitive material receives the optimum saturation for an ideal exposure of the selected area of the photosensitive material.

Figure 2:
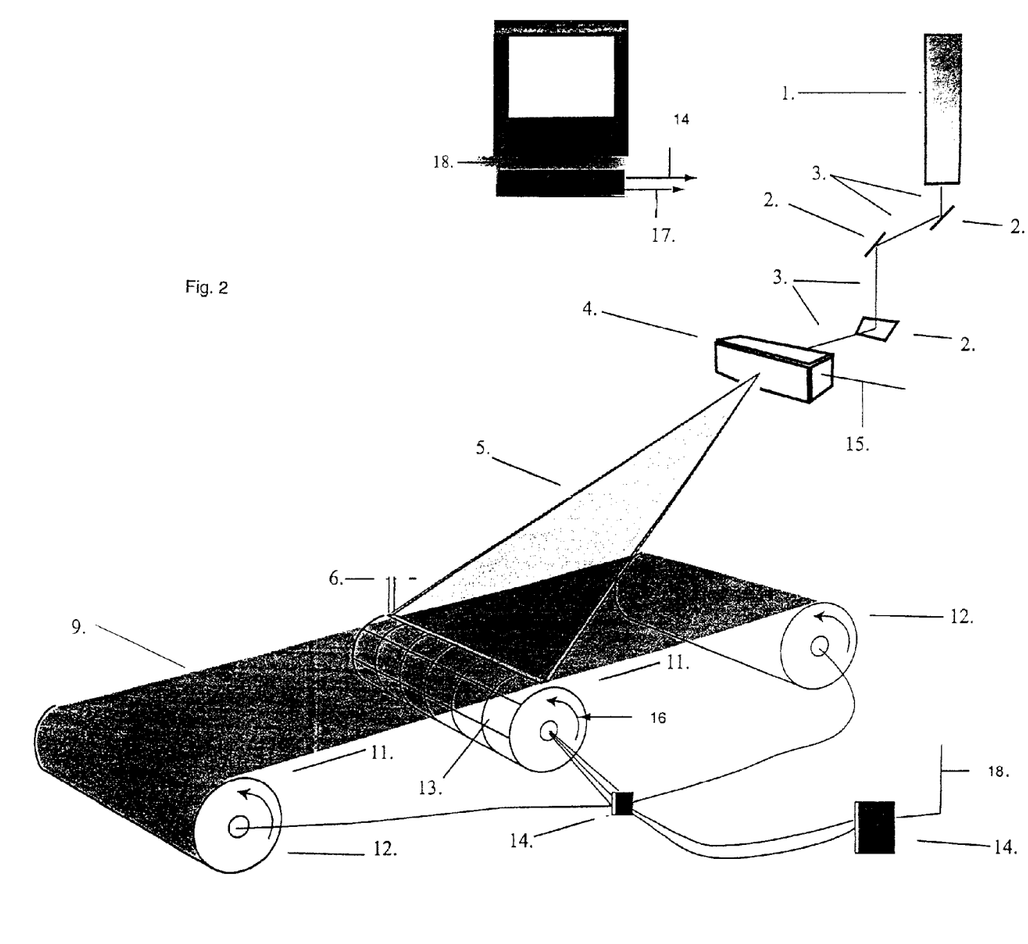
FIG. 2 is a schematic of a roller scanning system of the present invention comprising a module printing roller.

The roller scanning system shown in FIG. 2 is similar in operation, except that modular printing plate 8 is replaced by module printing roller 13, preferably comprising separate modules. Alternatively, the printing roller may be engraved or otherwise decorated. Although module printing roller 13 is shown rotating in direction 16, it may alternatively rotate in the opposite direction. The rolling speed of module printing roller 13 and rollers 12, all of which preferably roll at the same speed, is preferably determined by scanning length 6 of scanning beam 5 and the time required to expose photo-sensitive material 9 sufficiently to create a reflection hologram of maximum brightness for production. In one embodiment, rollers 12 and module printing roller 13 are advanced by one frame (for example, scanning length 6), an exposure is made, and then they are advanced by another frame. In another embodiment, the rollers advance continuously at an appropriate speed to form a continuous image on photo-sensitive material 9.

Figure 3:
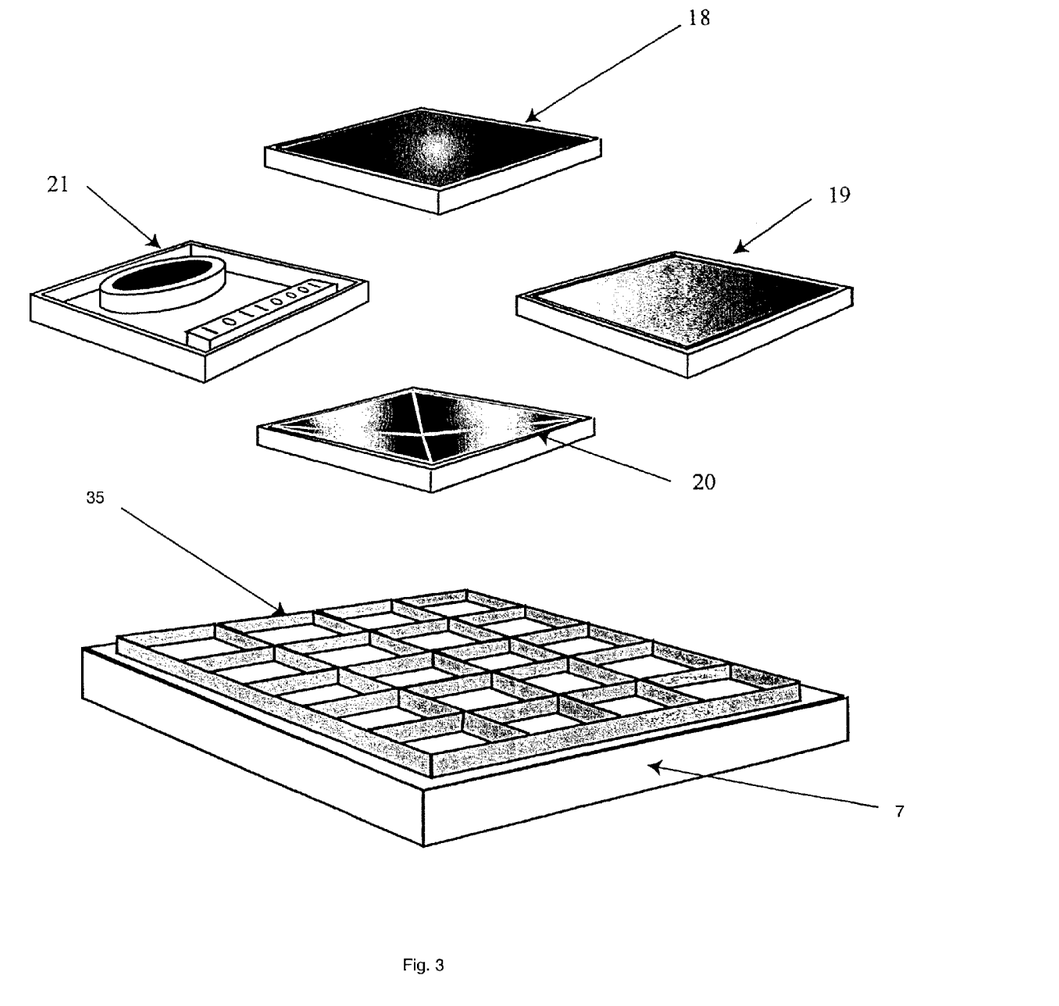
FIG. 3 shows an unloaded modular printing plate and the components thereof.

FIG. 3 shows the assembly of modular printing plate 8. Different image pots or base numbering module units 19, for example, are inserted into empty modular printing plate 35, which preferably is disposed on base 7. The pots preferably comprise at least one solid polished metal image or logo. All pots are preferably designed to be interchangeable with a plug and play interface. Once connected to the computer and micro-sub-systems, they can be controlled in any manner of ways, for example in order to increment the numbering thereon. One or more of the pots optionally comprise one or more optical elements, including but not limited to holographic optical element (HOE) 18, directional diffuser 19, optical construct 20, or an optical lens in order to enable the pot to function as an optically variable device, as is known in the art. For example, the optical element(s) may modulate the scanning beam as desired. The present invention can then be used in the manufacture of, for example, a heads up display. HOE 18 may optionally comprise a transmission hologram.

Figure 4:
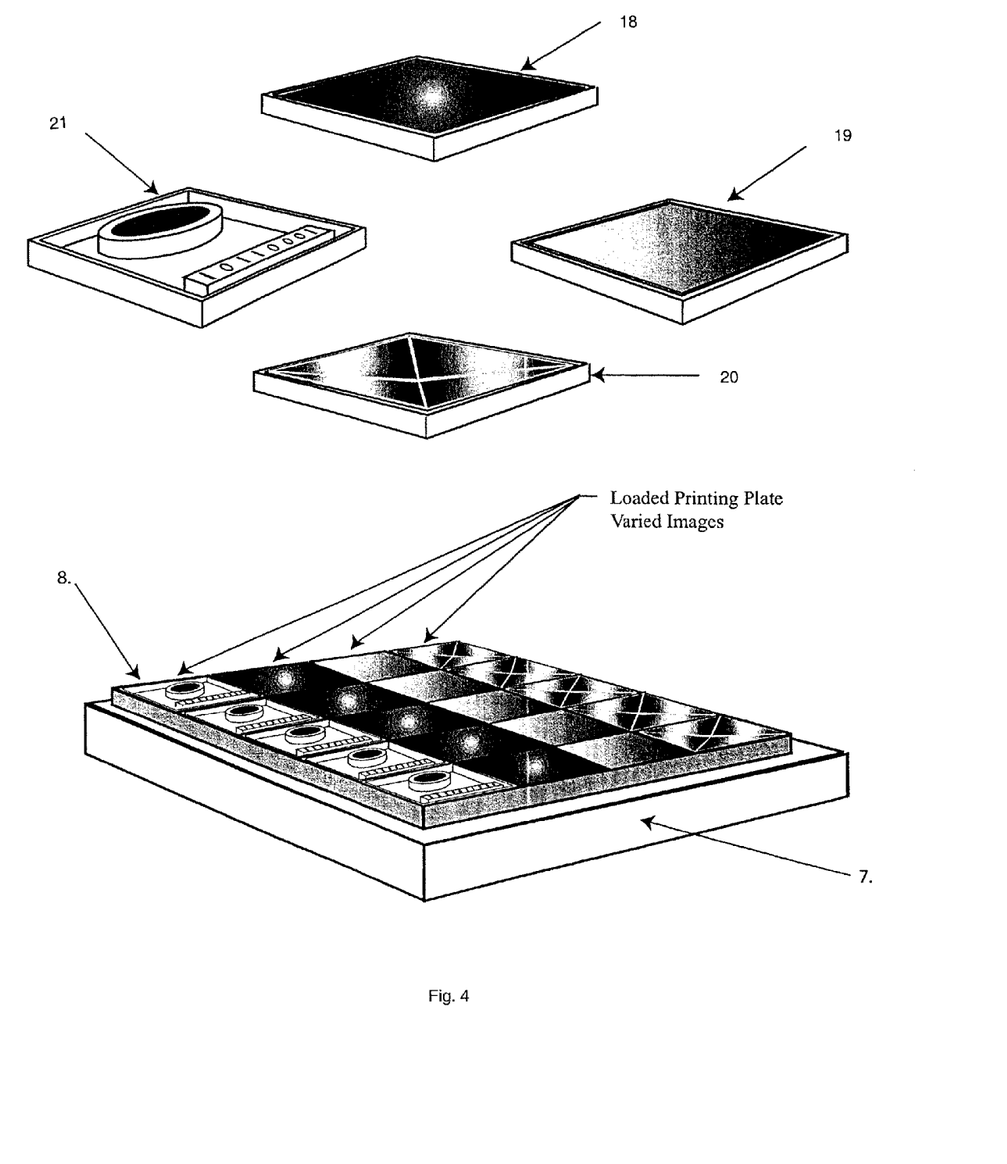
FIG. 4 shows a loaded modular printing plate and the components thereof.

Directional diffuser 19 may optionally comprise a cross grating or a variable grating. Base numbering module unit 21 is preferably pre-constructed and plugs into modular printing plate 8. Any number or configuration of pots may be employed. FIG. 4 shows one example of loaded modular printing plate 8.

Figure 5:
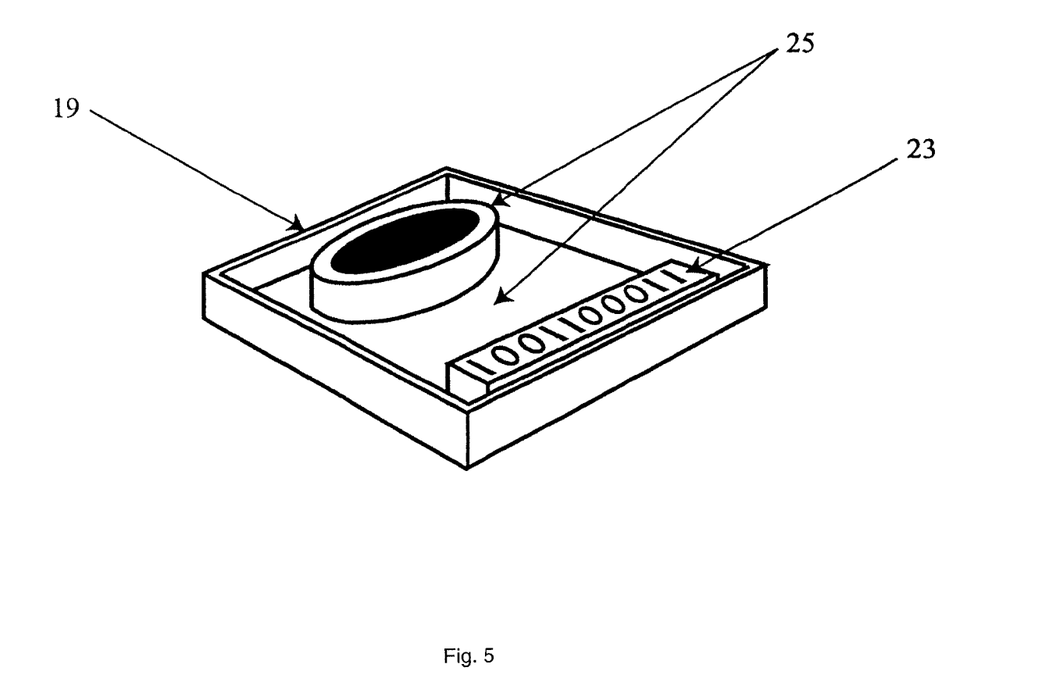
FIG. 5 shows a schematic of a module with a sequential numbering unit.

FIG. 5 depicts a proposed mechanical base numbering module unit 19. The numbers or other variable symbols displayed on variable component 23 are preferably individually electronically controlled. For example, variable component 23 may comprise a counter which displays, for example, sequential numbers. Any type of logo or image or combination thereof can be used in image area 25.

Figure 6:
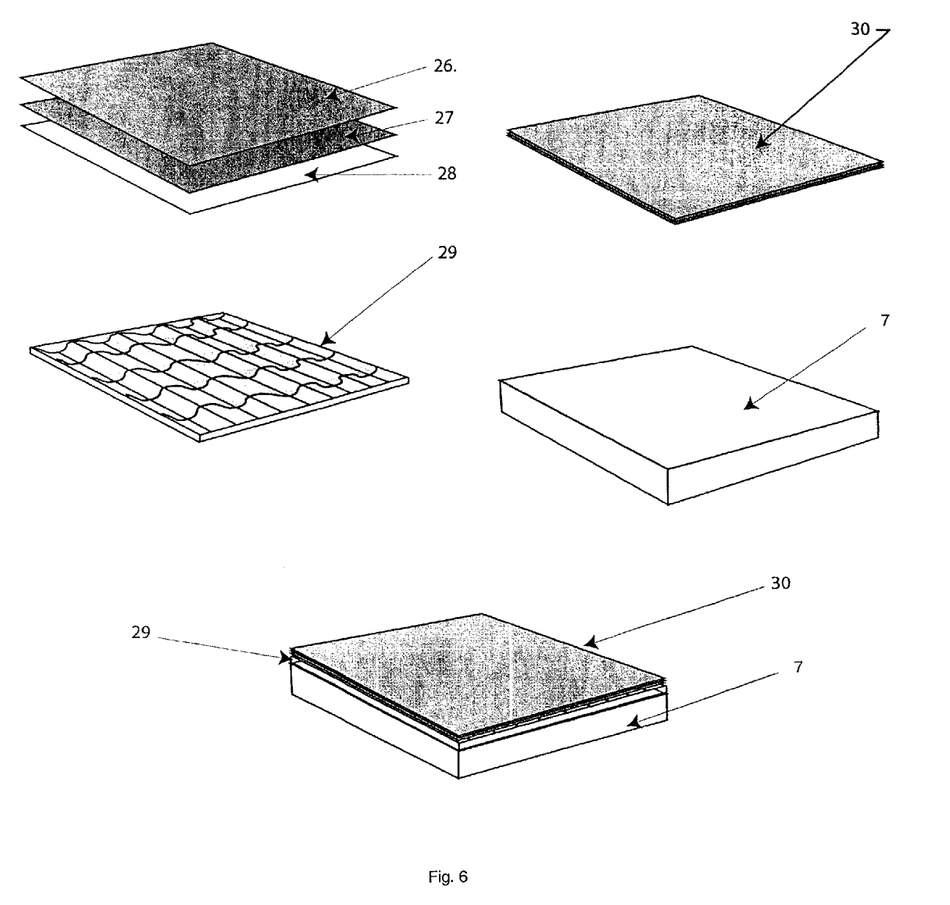
FIG. 6 shows an embodiment of the present invention using an assembled film and printing block.

FIG. 6 shows an embodiment of the present invention using an assembled film and printing block. Assembled film 30 preferably comprises a sheet of photo-sensitive material 28, release material 27, and carrier film 26. Assembled film 30 is preferably supplied in roll form for production. In this embodiment, object 29 is copied. Object 29 may comprise an engraved or otherwise decorated object plate or one or more transmission holograms or transmission holographic images or a recombined assemblage thereof. This method creates a continuous image on the roll of assembled film 30, without any varying numbers or other symbols. This continuous image may be used for stock image labels or the like.

Figure 7:
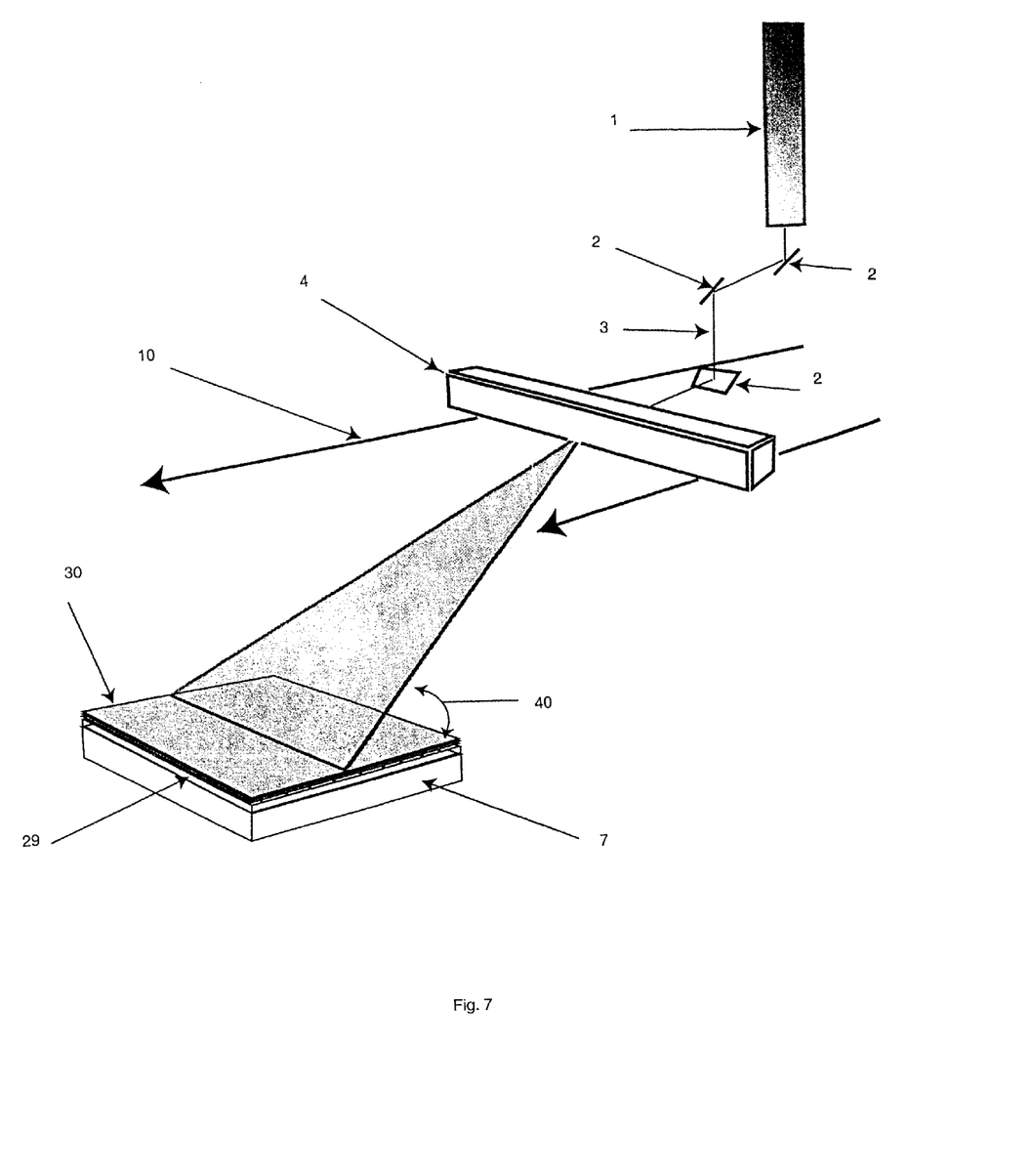
FIG. 7 is a schematic similar to FIG. 1 in which an object is copied to an assembled film.

FIG. 7 is similar to the system in FIG. 1, except that object 29 is copied instead of modular printing plate 8. Although only a piece of assembled film 30 is shown, assembled film 30 may be provided on rollers similar to photosensitive material 9 depicted in FIG. 1. In the case where object 29 comprises one or more transmission holographic images, angle of incidence 40 is preferably chosen to be approximately or equal to the original construction angle of the transmission holographic image(s).

Figure 8:
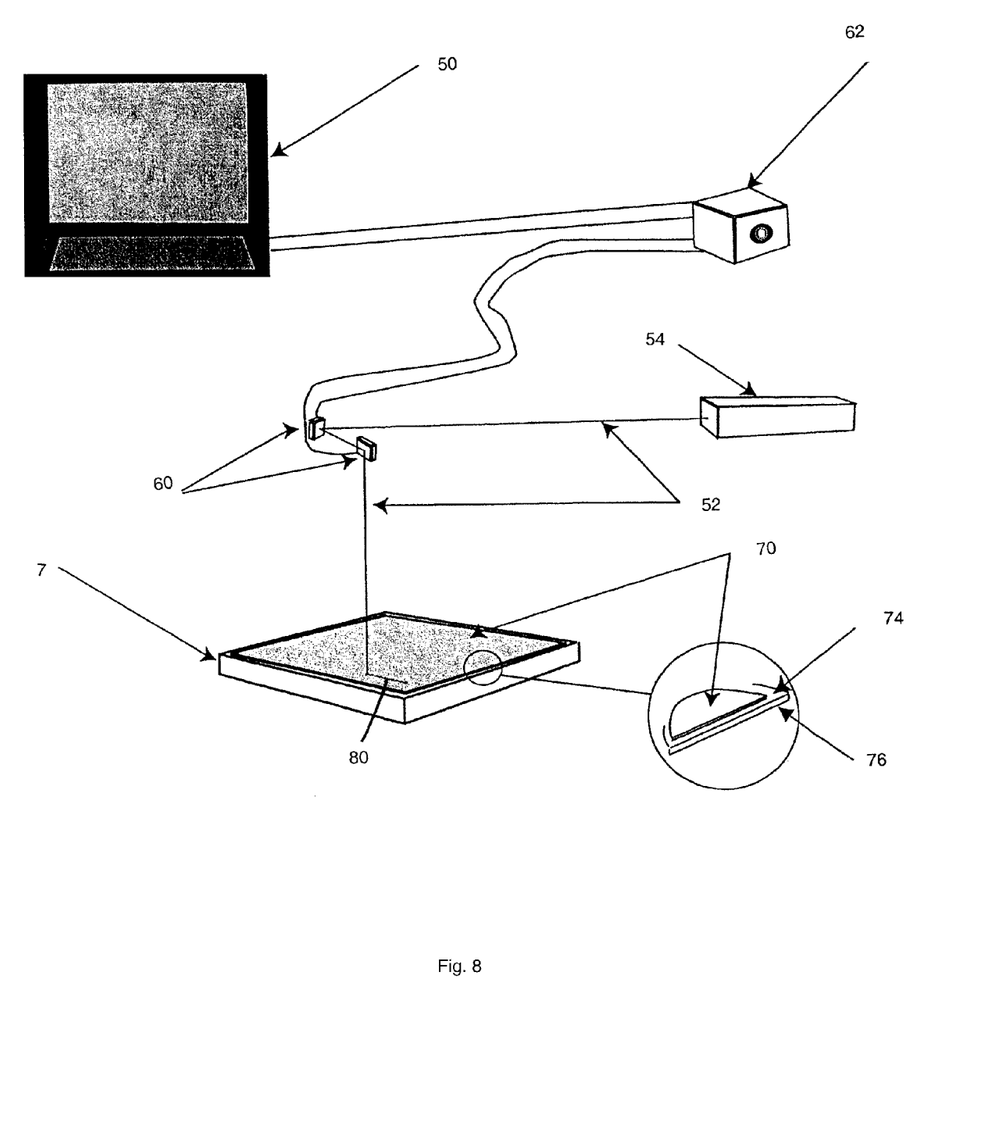
FIGS. 8 and 9 show two embodiments of a single beam scanning process of the present invention.
Figure 9:
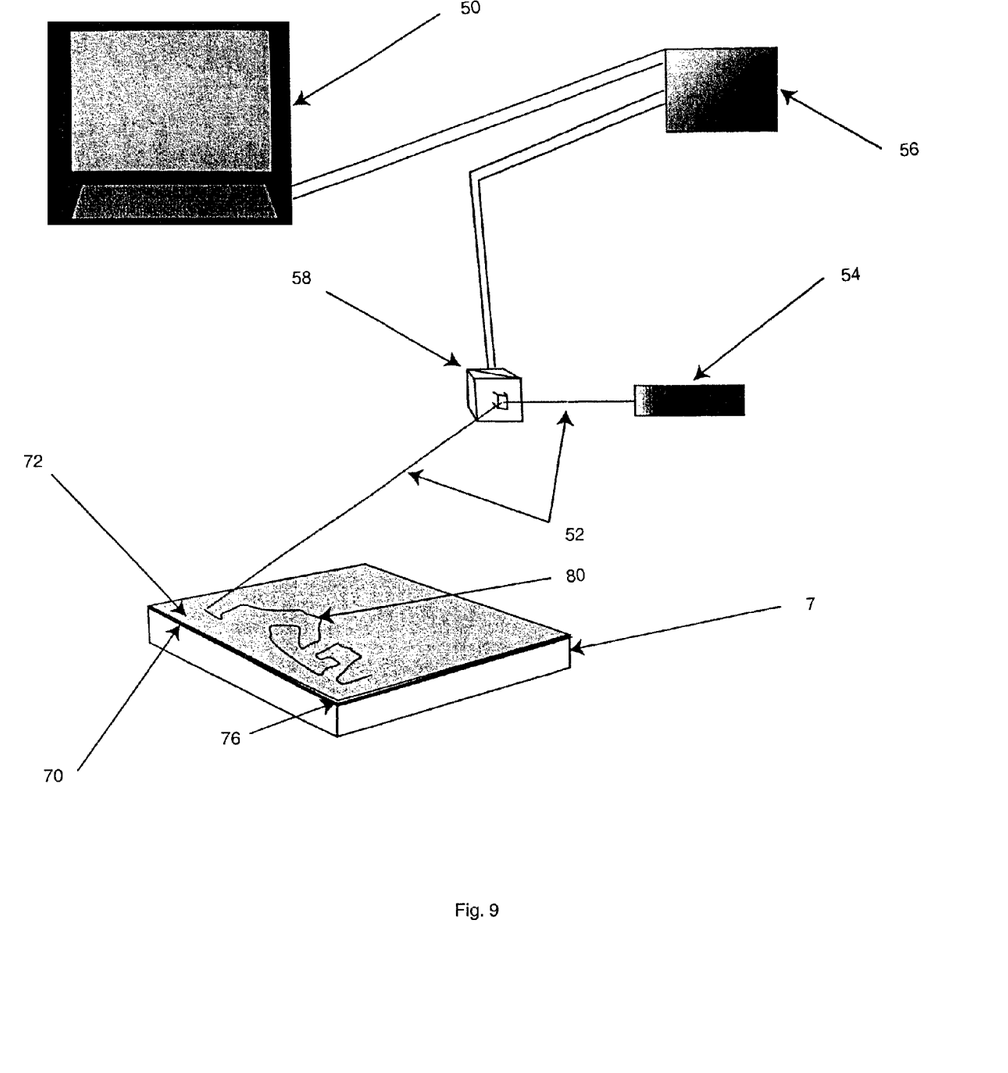

FIGS. 8 and 9 show two embodiments of a single beam reflection hologram scanning process of the present invention. Beam 52 generated by laser or other coherent radiation source 54 is preferably directed to the target by either scanning system 58 controlled by controller 56, or, alternatively, independently controllable piezoelectric x, y, and z mirrors 60 controlled by piezoelectric scanner controller 62. The controllers are themselves preferably controlled by computerized control unit 50. Beam 52 preferably approximately comprises a directional point source and is variably controllable. Photosensitive material 70, preferably comprising a recording plate, or optionally comprising a film which is optionally covered by carrier film 72, is preferably placed adjacent to directional diffuser 74, which is preferably disposed on surface mirror plate 76, which preferably comprises silver. Beam 52 is scanned along photosensitive material 70, thereby creating exposed area 80. In this way an image can selectively be drawn on photosensitive material 70. The arrangement of FIG. 8 enables the program/operator to access any area of the plate, to scan chosen areas sectional, or even to draw an image by scanning only relevant sections of the plate to create the image. Scanners 60 can be on a moving platform or a positioned relative to the plate. The arrangement of FIG. 9 is similar to that of FIG. 8 except that FIG. 9 uses a conventional scanner that has a fixed angle in relationship to the plate and would expose in a more or less fixed playback angle relative to its orientation between the laser and the plate to be exposed. The arrangement of FIG. 9 provides another way to scan a plate other then as seen in FIGS. 1, 2 and 7.

The roller, plate, and/or modules of the present invention preferably comprise steel, but may optionally comprise any material. They may optionally be polished, matted, or polished to a mirror finish, or are preferably otherwise highly reflective. The modules may be mirror backed. The image being copied may comprise a mirror or otherwise be highly reflective.

Although a hologram made according to the present invention may comprise a sticker or label, it may optionally comprise a release layer emulsion comprising a clear material. Unlike a sticker, this release layer may be incorporated directly into the target object, similar to a foil or other layer in, for example, a driver's license (except preferably without the plastic, i.e. the carrier material for the photo sensitive or photo refillable material layer).

Although the invention has been described in detail with particular reference to these preferred embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

What is claimed is:

1. A method for producing a reflection hologram, the method comprising the steps of:
    disposing an area of unexposed radiation-sensitive material proximate to an object;
    passing an incident beam of coherent radiation through the radiation-sensitive material;
    illuminating at least a portion of the object by scanning the incident beam across the object; and
    reflecting the incident beam from the object or from a mirror which reflects the beam back through the object, thereby producing a reflected beam; and
    interfering the reflected beam with the incident beam, thereby exposing the radiation-sensitive material to create a reflection hologram.

2. The method of claim 1 wherein the disposing step comprises moving the radiation-sensitive material across the object.

3. The method of claim 2 wherein the disposing step comprises unrolling unexposed radiation-sensitive material from a first roller and roiling up exposed radiation-sensitive material on a second roller.

4. The method of claim 1 wherein the coherent radiation comprises multiple wavelengths.

5. The method of claim 4 wherein the reflection hologram comprises a full parallax hologram.

6. The method of claim 4 wherein the object comprises multiple colors.

7. The method of claim 1 wherein a viewer of the hologram sees the entire scanned portion of the object.

8. The method of claim 1 wherein the hologram captures three dimensional imaging of only the portion of the object.

9. The method of claim 8 further comprising the step of varying a depth of the three dimensional imaging by varying a size of the incident beam.

10. The method of claim 1 wherein an incident beam size is smaller than the portion of the object.

11. The method of claim 10 wherein a width of the incident beam is approximately the same as a width of the portion of the object, and a length of the incident beam is smaller than a length of the portion of the object.

12. The method of claim 10 wherein the incident beam approximately comprises a point source.

13. The method of claim 1 wherein the radiation-sensitive material is exposed from more than one direction and/or by more than one beam.

14. The method of claim 1 wherein the object comprises one or more elements selected from the group consisting of decorated plate, image, holographic image, modular printing plate, counter, modular roller, image pot, numbering unit, module, mirror, highly reflective material, holographic optical element, directions diffuser, optical construct, optical lens, and optically variable device.

15. The method of claim 14 wherein the angle of the incident beam relative to the object is approximately the same as an original construction angle of the holographic image.

16. The method of claim 14 wherein the angle of the incident beam relative to the object is approximately perpendicular to an original construction angle of the holographic image.

17. The method of claim 14 wherein the angle of the incident beam relative to the object is different than an original construction angle of the holographic image.

18. The method of claim 1 wherein the object modulates the incident beam and/or the reflected beam.

19. The method of claim 1 further comprising the step of varying the object after the reflecting step.

20. The method of claim 19 wherein the varying step comprises changing a number or code on the object.

21. The method of claim 1 wherein the object comprises a roller rotating at a linear velocity substantially matching a conveying velocity of the radiation-sensitive material.

22. The method of claim 1 further comprising the step of monitoring a latent image.

23. The method of claim 1 wherein scanning the incident beam comprises moving either or both of the object and the incident beam relative to one another.

24. The method of claim 1 further comprising the step of varying a distance between the object and the radiation-sensitive material.

25. The method of claim 1 additionally comprising the step of sequentially numbering the reflection hologram.

26. The method of claim 1 wherein the steps are repeated for a second area of unexposed radiation-sensitive material.

27. The method of claim 1 wherein the radiation-sensitive material is selected from the group consisting of film, assembled film, sticker, label, and release layer.

28. The method of claim 27 wherein the assembled film comprises a layer of radiation-sensitive material, a release layer, and a carrier film.

29. The method of claim 1 wherein the radiation-sensitive material is profileable.

30. The method of claim 1 wherein the steps of the invention are repeated a plurality of times to create a single reflection hologram.

* * * * *

UNITED STATES PATENT AND TRADEMARK OFFICE
CERTIFICATE OF CORRECTION

PATENT NO. : 7,616,363 B2 Page 1 of 1
APPLICATION NO. : 11/459821
DATED : November 10, 2009
INVENTOR(S) : Kenneth R. Harris It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 480 days.

Signed and Sealed this

Nineteenth Day of October, 2010

David J. Kappos
*Director of the United States Patent and Trademark Office*